United States Patent
Lewandowski et al.

(10) Patent No.: US 11,646,613 B2
(45) Date of Patent: May 9, 2023

(54) STATOR FOR AN ELECTRICAL MACHINE, IN PARTICULAR OF A MOTOR VEHICLE, AND METHOD FOR PRODUCING SUCH A STATOR

(71) Applicant: Vitesco Technologies Germany GMBH, Hannover (DE)

(72) Inventors: Marek Lewandowski, Erlangen (DE); Markus Hövermann, Rückersdorf (DE)

(73) Assignee: VITESCO TECHNOLOGIES GERMANY GMBH, Hannover (DE)

( * ) Notice: Subject to any disclaimer, the term of this patent is extended or adjusted under 35 U.S.C. 154(b) by 305 days.

(21) Appl. No.: 16/788,071

(22) Filed: Feb. 11, 2020

(65) Prior Publication Data
US 2020/0185986 A1    Jun. 11, 2020

Related U.S. Application Data

(63) Continuation of application No. PCT/EP2018/071982, filed on Aug. 14, 2018.

(30) Foreign Application Priority Data

Aug. 18, 2017    (DE) .................... 10 2017 214 427.0

(51) Int. Cl.
*H02K 1/20* (2006.01)
*B60K 1/00* (2006.01)
*H02K 5/20* (2006.01)

(52) U.S. Cl.
CPC ............. *H02K 1/20* (2013.01); *H02K 5/20* (2013.01); *B60K 1/00* (2013.01)

(58) Field of Classification Search
CPC ................................ H02K 3/525; H02K 1/20
See application file for complete search history.

(56) References Cited

U.S. PATENT DOCUMENTS 5,886,433 A * 3/1999 Oda .................... B60L 1/003
310/59
6,288,460 B1    9/2001 Fakult et al.
(Continued)

FOREIGN PATENT DOCUMENTS

DE        911263 C      5/1954
DE        10258778 B    1/1968
(Continued)

OTHER PUBLICATIONS

Shin (Kr 20010002939 (A)) English Translation (Year: 2001).*
(Continued)

*Primary Examiner* — Burton S Mullins
*Assistant Examiner* — Robert E Mates

(57) ABSTRACT

A stator for an electrical machine, with at least one laminated stator core, and with at least one end cap following the laminated stator core in the axial direction of the stator, at least one line element, which is formed separately from the end cap and separately from the laminated stator core and has at least one first cooling channel, through which a cooling medium for cooling the stator may flow, being provided, having a first length region, extending in the laminated stator core, and a second length region, which extends in the end cap, which has at least one second cooling channel, through which the cooling medium may flow and which is fluidically connected to the first cooling channel.

18 Claims, 1 Drawing Sheet

(56) References Cited

U.S. PATENT DOCUMENTS

| | | |
|---|---|---|
| 8,405,262 B1 | 3/2013 | Beatty et al. |
| 2010/0026949 A1 | 2/2010 | Wu et al. |
| 2013/0076171 A1* | 3/2013 | Lepres ............... H02K 9/19 |
| | | 310/59 |

FOREIGN PATENT DOCUMENTS

| | | |
|---|---|---|
| DE | 102011076904 A1 | 12/2012 |
| DE | 102011117517 A1 | 5/2013 |
| DE | 102013105553 A1 | 12/2013 |
| DE | 102014223527 A1 | 6/2016 |
| EP | 0581966 A1 | 2/1994 |
| KR | 20010002939 A * | 1/2001 |

OTHER PUBLICATIONS

International Search Report and Written Opinion dated Oct. 26, 2018 from corresponding International Patent Application No. PCT/EP2018/071982.

German Office Action dated May 24, 2018 for corresponding German Patent Application No. 10 2017 214 427.0.

* cited by examiner

STATOR FOR AN ELECTRICAL MACHINE, IN PARTICULAR OF A MOTOR VEHICLE, AND METHOD FOR PRODUCING SUCH A STATOR

CROSS-REFERENCE TO RELATED APPLICATIONS

This application claims priority to PCT Application PCT/EP2018/071982, filed Aug. 14, 2018, which claims priority to German Patent Application No. 10 2017 214 427.0, filed Aug. 18, 2017. The disclosures of the above applications are incorporated herein by reference.

FIELD OF THE INVENTION

The invention relates to a stator for an electrical machine of a motor vehicle. The invention also relates to a method for producing such a stator.

BACKGROUND OF THE INVENTION

Stators for electrical machines, such as motor vehicles, and methods for producing such stators are already sufficiently well known from the general prior art. The stator has in this case at least one laminated stator core and at least one end cap, which follows the laminated stator core in the axial direction of the stator. The end cap for example directly adjoins the laminated stator core in the axial direction of the stator.

As part of a method for producing such a stator, for example, the laminated stator core and the end cap are provided. Furthermore, for example, the end cap is arranged in such a way that the end cap follows the laminated stator core in the axial direction of the stator.

SUMMARY OF THE INVENTION

The object of the present invention is to provide a stator and a method of the type mentioned at the beginning, such that cooling of the stator is realized in an easy way.

This object is achieved according to the invention by a stator with the features described herein, and by a method with the features also described herein. Advantageous configurations with expedient developments of the invention are also described herein.

A first aspect of the invention concerns a stator for an electrical machine, such as a motor vehicle, such as for example a motor car. The stator has at least one laminated stator core and at least one end cap, which adjoins the laminated stator core or follows the laminated stator core in the axial direction of the stator. For example, the end cap directly adjoins the laminated stator core in the axial direction of the stator, such that for example the end cap touches or contacts the laminated stator core, such as an axial end face of the laminated stator core is contacted directly. The end cap is usually also referred to as the end plate, it being possible for the end cap to serve as a bearing plate for bearing the rotor. Usually, respective end caps or end plates follow the laminated stator core on both sides in the axial direction of the stator, such that for example the laminated stator core is arranged between the end caps or end plates in the axial direction. Such as, for example, the laminated stator core is clamped between the end caps or is pressed in the axial direction by means of the end caps.

In order therefore to be able to realize efficient and effective cooling of the stator in an easy way, it is provided according to the invention that the stator has at least one line element, which is formed separately from the end cap and separately from the laminated stator core and has at least one first cooling channel, through which a cooling medium for cooling the stator may flow. The cooling medium is a cooling fluid, such as a liquid such as for example a water-glycol mixture, such that for example the stator is cooled as a result of a heat transfer from the stator to the cooling medium. The laminated stator core, the end cap and the line element are in this case components that are formed separately from one another and are connected to one another.

The line element also has a first length region, which extends in the stator core or within the stator core, while for example the first cooling channel is provided or extends at least in the first length region. Furthermore, the line element has a second length region, which for example adjoins the first length region in the direction of longitudinal extent of the line element. For example, the direction of longitudinal extent of the line element coincides with the axial direction of the stator. The second length region in this case extends in the end cap. It is also possible that the first cooling channel may also be provided in the second length region.

Furthermore, the end cap has at least one second cooling channel, through which the cooling medium may flow and which is fluidically connected to the first cooling channel. This fluidic connection of the cooling channels allows for example the cooling medium that first flows through one of the cooling channels to flow out of the one cooling channel and into the other cooling channel, respectively, such that an effective and efficient heat dissipation is provided. The fact that the line element and consequently the first cooling channel extend within the laminated stator core, and consequently penetrate the laminated stator core, allows efficient and effective cooling of the stator in its interior to be realized. In addition, the stator is produced and assembled in an easy and consequently time-saving and inexpensive manner.

The invention is in this case based on the perception that electrical machines, such as electrical machines designed for driving motor vehicles, are usually cooled by way of so-called jacket cooling. In the case of this jacket cooling, the laminated stator core together with the winding is inserted into a housing of the electrical machine, the housing having internal cooling channels which run around the stator and consequently do not extend within the laminated stator core but surround the laminated stator core on the outer circumference. Studies have found two disadvantages of jacket cooling. The first of the disadvantages is that jacket cooling has a difficult-to-control thermal interface between the laminated stator core, such as the rough surface thereof, and the cooling channels that are for example a component part of the cooling jacket of the jacket cooling. The second disadvantage is that, because the housing has the cooling channels of the jacket cooling, with a given outside diameter of the electrical machine, it is only possible to realize a small outside diameter of the stator, since the cooling channels of the jacket cooling outwardly adjoin the stator in the radial direction. An advantage of jacket cooling, however, is that the sealing of the cooling channels of the jacket cooling is performed independently of the laminated stator core, such as the structure thereof.

Furthermore, it is possible to use so-called direct cooling, in which the cooling medium, also referred to as the cooling agent, is directed through channels, formed for example as bores, directly in the laminated stator core. These channels are in this case delimited directly by the laminated stator core, such that the cooling medium flowing through the channels may flow onto, and consequently contact, the laminated stator core directly. Direct cooling brings with it certain complex challenges, since without further measures the laminated stator core itself is not seal-tight. Furthermore, the laminated stator core, such as the individual sheets thereof, may corrode due to the direct contact with the cooling medium, resulting in additional, demanding requirements for the cooling medium, such as the composition thereof, and with regard to realizing corrosion protection. Furthermore, it is usually required in the case of direct cooling that the feed line of the cooling medium must be secured and sealed with respect to the laminated stator core. This is a complex procedure. One advantage of direct cooling, however, is that a great outside diameter of the stator, such as the laminated stator core, is realized, such that an increase in the so-called air gap diameter, and consequently in the output power of the electrical machine, is realized in comparison with jacket cooling.

The idea on which the invention is based is therefore to avoid jacket cooling, or to combine its advantages with direct cooling or the advantages thereof, and thereby avoid the respective disadvantages of jacket cooling and direct cooling. The fact that the first cooling channel is not delimited directly by the laminated stator core, but directly by the line element, and the fact that the second cooling channel is formed through the end cap formed separately from the laminated stator core allows the direct cooling or the principle thereof to be realized in an easy way, it being easily possible for sufficient sealing of the stator to be realized in order to avoid undesired leakages of the cooling medium. In other words, the stator according to the invention makes it possible to realize methods for the inexpensive and technically uncomplex sealing of the cooling channels, such that the costs of the stator may be kept low, while at the same time realizing efficient and effective cooling of the stator.

It is possible for example by the use of the line element to avoid undesired direct contact of the cooling medium with the laminated stator core, which is for example itself open, such that corrosion of the laminated stator core brought about by the cooling medium is avoided. The line element may in this case be produced inexpensively from such a material that is robust or insusceptible to corrosion that may potentially be brought about by the cooling medium, such that it is possible to dispense with a special, expensive composition of the cooling medium. This allows both the costs of the laminated stator core and the costs for the cooling medium to be kept low. In other words, a simple medium, such as a simple fluid, such as for example a water-glycol mixture, is used as the cooling medium, without the cooling medium having to be laboriously treated or mixed with anticorrosives.

In order to be able to produce the stator, and the effective cooling thereof, in an easy and consequently inexpensive way, it is preferably provided that the line element itself is formed as an intrinsically rigid pipe element or small tube. This allows for example the line element to be easily handled in the course of the production of the stator, and to be arranged in the laminated stator core and in the end cap.

In the case of a further embodiment of the invention, the line element is formed from at least one plastic, such that a high corrosion resistance of the line element is realized in an easy and inexpensive way. Furthermore, this allows the line element to be sealed well with respect to the laminated stator core and with respect to the end cap in an easy and inexpensive way, such that for example the cooling channels may be sealed well by means of the line element.

A further embodiment is distinguished by the fact that the line element is formed from a metallic material, such as from copper or aluminum. This allows a great robustness and corrosion resistance of the element to be realized, while at the same time the cooling channels are sealed well and easily.

In the case of an embodiment of the invention, the line element is coated with a plastic, such as with a thermoplastic. The thermoplastic is for example a thermoplastic adhesive. The coating of the line element allows it to be connected for example easily to the laminated stator core and to the end cap. Furthermore, great seal-tightness is provided in an easy way.

In a further refinement of the invention, the line element is deformed, and thereby widened, at least in a partial region. This allows for example the line element to be sealed with respect to the laminated stator core and/or with respect to the end cap in an easy way, such that the cooling channels are sealed in an easy way. No further additional components or seals, such as for example O-rings, are provided or required for the sealing, such that the number of parts and consequently the weight, the installation space requirement and the costs of the stator is kept low.

A further advantage of the stator according to the invention is that, because the line element extends partially in the laminated stator core and partially in the end cap, a great diameter, such as the outside diameter, of the stator as a whole is created. By means of the cooling channels, cooling in the manner of direct cooling of the stator is realized, such that for example it is possible to dispense with jacket cooling. As a consequence, an adverse effect on the outside diameter of the stator that is brought about by such jacket cooling is avoided, such that for example, with a given outside diameter of the electrical machine, a great power capacity or power output of the electrical machine is provided.

In the case of an embodiment of the invention, it is provided that the second length region extends in the second cooling channel. In other words, the second length region reaches into the second cooling channel, whereby the cooling channels may be fluidically connected to one another in an advantageous way. Furthermore, as a result the stator is produced easily and inexpensively.

A further embodiment is distinguished by the fact that the end cap has an at least substantially annular clearance, which is separated from the second cooling channel by a wall region of the end cap. The wall region is for example arranged between the clearance and the second cooling channel in the radial direction of the stator or of the end cap. In this case, the second length region extends in the clearance. In this case, it is provided that the second length region or the line element is arranged completely outside the second cooling channel. For example, the wall region is arranged in the second length region, or the wall region reaches into the second length region and consequently for example into the first cooling channel, whereby for example the cooling channels may be sealed advantageously.

In order to be able to seal the cooling channels, it is provided in a further refinement of the invention that the line element is connected in a material-bonding manner, such as adhesively bonded, to the end cap in the clearance.

It has also been found to be advantageous if at least part of the second length region is deformed by means of the wall region, and for example thereby widened. In this way, the cooling channels may be sealed in an easy way. The deforming, or widening, of the second length region is performed for example in such a way that the second length region, and consequently the line element, are inserted into the clearance in the axial direction, whereby for example the wall region is inserted into the second length region or into the first cooling channel in the axial direction. This involves for example the wall region coming into contact with the line element, whereby the latter is deformed, and widened, for example at least in the second length region.

A second aspect of the invention concerns a method for producing a stator, such as a stator according to the invention, for an electrical machine, such as a motor vehicle. The method includes a first step, in which at least one laminated stator core is provided. In a second step of the method, at least one end cap is provided. In a third step of the method, the end cap is arranged in such a way that the end cap follows the laminated stator core in the axial direction of the stator.

In order therefore to be able to realize efficient and effective cooling of the stator in an easy way, according to the invention the method includes a fourth step, in which at least one line element is provided, formed separately from the end cap and separately from the laminated stator core and having at least one first cooling channel, through which a cooling medium for cooling the stator may flow. In a fifth step of the method, the end cap is provided with at least one second cooling channel, through which the cooling medium may flow. In a sixth step of the method, a first length region of the line element is arranged in the laminated stator core, also referred to as the stator core, and, in a seventh step of the method, a second length region of the line element is arranged in the end cap. In an eighth step of the method, the first cooling channel is fluidically connected to the second cooling channel. Advantages and advantageous refinements of the first aspect of the invention are regarded as advantages and advantageous refinements of the second aspect of the invention, and vice versa. It should be emphasized that the steps of the method do not necessarily have to be carried out in the stated sequence, but may also be carried out in some other sequence.

It has been found to be advantageous if the end cap is arranged relative to the laminated stator core in such a way that at least part of the second cooling channel overlaps an opening, such as a through opening, formed in the laminated stator core, also referred to simply as the laminated core. After that, the first length region is arranged in the laminated stator core and the second length region is arranged in the end cap, and the cooling channels are fluidically connected to one another, in such a way that the line element is fitted through the opening of the laminated stator core in the axial direction of the stator and inserted into the end cap into the clearance or into the second cooling channel. This allows the stator to be produced easily and inexpensively, while at the same time effective and efficient cooling is realized, such as in the manner of direct cooling.

In a further refinement of the invention, the line element is heated in a state in which the first length region is arranged in the laminated stator core and the second length region is arranged in the end cap, and is thereby brought into a heated state. In the heated state, the line element is deformed, at least in a partial region, and for example thereby widened, whereby, for sealing the cooling channels, the line element may for example be sealed advantageously with respect to the laminated stator core and/or with respect to the end cap.

In order to be able to deform, and thereby widen, the line element easily, it is provided in a further refinement of the invention that the line element is widened, at least in the partial region, by means of a gas which is directed into the channels or through them. The gas, which may for example be air, is directed into the cooling channels at such a pressure sufficient for the gas to deform and thereby widen the heated line element by its pressure. As a result, for example, the line element is pressed outward in its radial direction, against the laminated stator core and/or against the end cap, whereby the line element is advantageously sealed with respect to the laminated stator core and with respect to the end cap. As a consequence, the cooling channels are sealed, such that undesired leakages of the cooling medium may be avoided.

In order to be able to heat the line element easily, with little effort and as a result in a time-saving and inexpensive manner, it is preferably provided that the line element is heated by means of the gas, by means of which the line element is deformed and thereby widened.

Further advantages, features and details of the invention will emerge from the following description of preferred exemplary embodiments and from the drawing. The features and combinations of features mentioned in the description above and the features and combinations of features mentioned in the description of the figures below and/or shown in the figures alone may be used not only in the respectively stated combination, but also in other combinations or alone without departing from the scope of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

In the figures, identical or functionally identical elements are provided with identical reference signs.

Figure 1:
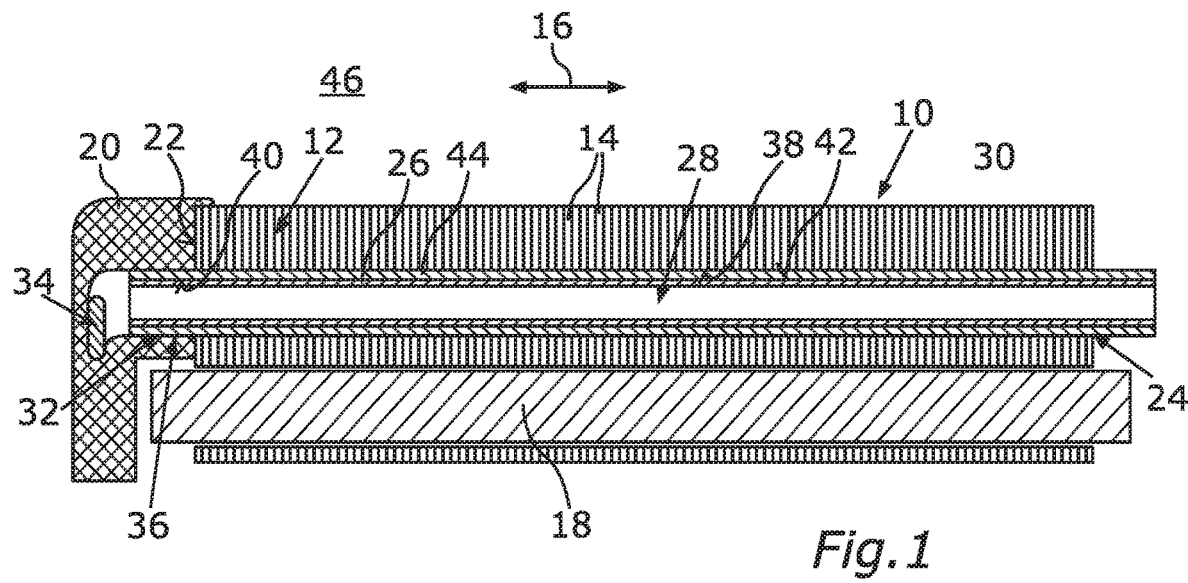
FIG. 1 shows a schematic longitudinal sectional view of a detail of a stator according to the invention according to a first embodiment for an electrical machine, with a laminated stator core, with at least one end cap and with at least one line element formed separately from the end cap and separately from the laminated stator core.

FIG. 1 shows in a schematic longitudinal sectional view a detail of a first embodiment of a stator 10 for an electrical machine of a motor vehicle, such as a motor car such as for example a passenger car. In its completely produced state, the motor vehicle includes a drive train, by means of which the motor vehicle is driven. The drive train in this case includes the electrical machine, by means of which for example at least one wheel of the motor vehicle or the motor vehicle as a whole is driven. The motor vehicle is consequently formed for example as an electric or hybrid vehicle and in this case is electrically driven by means of the electrical machine.

In its completely produced state, the electrical machine includes the stator 10 and a rotor, which is not represented in the figures and for example is rotatable about an axis of rotation relative to the stator 10. The stator 10 includes a laminated stator core 12, which is also referred to hereinafter simply as the stator core or laminated core. The laminated stator core 12 has for example a plurality of individual sheets 14, which for example are arranged following one another in the axial direction of the stator 10, and consequently are stacked. In this case, the axial direction of the stator 10 is illustrated in FIG. 1 by a double-headed arrow 16, the axial direction of the stator 10 coinciding with the axial direction of the electrical machine. In this case, the axial direction of the stator 10 coincides with the axis of rotation of the rotor.

Furthermore, the stator 10 includes at least one stator winding 18, which is also simply referred to as the winding and is held on the laminated stator core 12. In the axial direction of the stator 10, the laminated stator core 12 is adjoined on both sides by respective end caps, which are also referred to as end elements or end plates and one of which, denoted by 20, is seen in FIG. 1. The statements made above and below with respect to the end cap 20 may also be readily transferred to the other end cap, and vice versa. It is seen from FIG. 1 that the end cap 20 directly adjoins the laminated stator core 12 in the axial direction of the stator 10, such that the end cap 20 directly touches or contacts the laminated stator core 12, such as an end face 22 of the laminated stator core 12 that is facing the end cap 20 in the axial direction. Consequently, the laminated stator core 12 is arranged between the end caps in the axial direction of the stator 10, while for example the laminated stator core 12, such as the individual sheets 14, is or are pressed in the axial direction by means of the end caps. The end caps, also referred to as end caps, are for example used at the same time as bearing plates, in order to bear the rotor, which is not depicted. Furthermore, for example, the individual sheets 14 or the laminated stator core 12 is/are clamped between the end caps.

The laminated stator core 12 has at least one opening 24, which penetrates the laminated stator core 12 in the axial direction completely or at least partially, and is consequently formed as a through-opening (or a blind hole) of the laminated stator core 12. The opening 24 is consequently arranged within the laminated stator core 12, and is thereby delimited in its circumferential direction over much of the circumference by the laminated stator core 12.

For example, in the case of direct cooling, the opening 24 may itself act or be used as a cooling channel, which may be flowed through by a cooling medium and is directly delimited by the laminated stator core 12. This direct delimitation should be understood as meaning that the cooling medium flowing through the opening 24 or the cooling channel, and formed as a cooling fluid, flows onto, and consequently touches or contacts, the laminated stator core 12, or the wall region thereof that directly delimits the cooling channel, which however could result in corrosion of the laminated stator core 12 whenever the cooling medium is not mixed with anticorrosives. Furthermore, in the case of such direct cooling, sufficient sealing of the stator 10, which itself is open, or of the laminated stator core 12, which itself is open, is very laborious.

As is seen from FIG. 1, the opening 24 extends at least broadly axially, that is to say at least substantially in the axial direction of the stator 10, the opening 24 for example extending in a straight line. It is conceivable that respective ends or end regions of the opening 24 extend at least broadly axially, that is to say at least substantially in the axial direction, it being possible if appropriate for a middle region of the opening 24 that extends between the end regions to be formed in any way desired.

The opening 24 has a direction of longitudinal extent that coincides with the axial direction of the stator 10. The opening 24 may for example optionally have a regular form, and in this case maintain for example over the entire axial length of the laminated stator core 12 or of the opening 24 an at least substantially constant cross section, through which for example the cooling medium may flow. Other configurations or forms are however quite conceivable.

The opening 24 may for example be produced in such a way that, before their stacking, that is to say before the production of the actual laminated stator core 12, the individual sheets 14 are provided with respective through-openings, such that the through-openings are already provided in a blank of the individual sheets 14. The individual sheets 14 are then stacked one on top of the other in the axial direction of the stator 10, in such a way that the respective through-openings of the individual sheets 14 mutually overlap, and thereby altogether form the opening 24. Alternatively, it is conceivable that the opening 24 is produced after the individual sheets 14 have been stacked one on top of the other. Consequently, for example, the individual sheets 14 stacked one on top of the other first form the laminated stator core 12 that does not yet have the opening 24, which for example is then machined, such as drilled or milled, to produce the opening 24. Consequently, the opening 24 is produced for example by drilling or milling the laminated stator core 12 once the individual sheets 14 have been stacked one on top of the other.

The laminated stator core 12 may have a number of openings that follow one another in the circumferential direction of the laminated stator core 12, and for example are spaced apart from one another, it being possible for the statements made above and below with respect to the opening 24 also to be transferred to the other possibly provided openings of the laminated stator core 12, and vice versa.

In order therefore to be able to realize efficient and effective cooling of the stator 10 in an easy and inexpensive way, at least one line element 26 is provided, formed separately from the end cap 20 and separately from the laminated stator core 12 and having at least one first cooling channel 28, through which the cooling medium for cooling the stator 10 may flow.

It is seen from FIG. 1 that the line element 26 is held in the opening 24, such that the cooling medium flowing through the cooling channel 28 flows through the opening 24. In this case, however, the cooling channel 28 is not directly delimited by the laminated stator core 12, but is directly delimited by the line element 26. The cooling medium flowing through the cooling channel 28, and consequently the opening 24, consequently touches the line element 26 directly, but not the laminated stator core 12, such that corrosion of the laminated stator core 12 that is brought about by the cooling medium is avoided.

The line element 26 has a first length region 30, extending in the laminated stator core 12 and in this case in the opening 24, and also a second length region 32, which, for example in the direction of longitudinal extent of the line element 26, adjoins the first length region 30 directly. In this case, for example, the direction of longitudinal extent of the line element 26 coincides with the direction of longitudinal extent of the opening 24. Consequently, for example, the line element 26 extends at least substantially in the axial direction of the stator 10.

Furthermore, it is seen from FIG. 1 that the end cap 20 has at least one second cooling channel 34, through which the cooling medium may flow and which is fluidically connected to the first cooling channel 28. Consequently, for example, the cooling medium flowing through the cooling channel 28 may flow out of the cooling channel 28 and into the cooling channel 34 and/or vice versa. If, for example, respective line elements are also arranged in the other openings of the laminated stator core 12 that cannot be seen in FIG. 1, it is for example conceivable that the respective first cooling channels of the respective line elements are fluidically connected to the cooling channel 34 and/or are fluidically connected to one another by way of the cooling channel 34. Consequently, for example, the cooling channel 34 acts as a connecting channel.

At least in a third length region 36, the cooling channel 34 extends for example at least substantially in the axial direction of the stator 10. Furthermore, at least in the length region 36, the cooling channel 34 opens toward the opening 24, while for example the cooling channel 34 in the length region 36 and the opening 24 have the same geometry, such as the same inner circumference and the same form. As a result, for example, an inner-circumferential lateral surface 38 of the laminated stator core 12 goes over at least substantially seamlessly or without any transition, that is to say without any offset or edge, into the cooling channel 34 or into the length region 36, such as into an inner-circumferential lateral surface 40 of the end cap 20, while for example the inner-circumferential lateral surface 38 delimits the opening 24 and the inner-circumferential lateral surface 40 delimits the length region 36. The length region 36 has for example a length extending in the axial direction of the stator 10 of several millimeters, while for example over these millimeters, that is to say in the length region 36, the cooling channel 34 extends at least substantially tangentially in relation to the opening 24 in the laminated stator core 12.

Preferably, the line element 26 itself is formed as an intrinsically rigid pipe element or small tube, which is easily handled and arranged in the laminated stator core 12 and in the end cap 20.

In the course of production of the stator 10, for example, the end cap 20 is arranged relative to the laminated stator core 12 in such a way that for example the length region 36 of the cooling channel 34 overlaps the opening 24 or is arranged coaxially in relation to the opening 24. After that, the preferably intrinsically rigid line element 26 is fitted through the opening 24 in the axial direction of the stator 10 and inserted into the end cap 20, while in the case of the first embodiment the line element 26, such as the length region 32, is inserted into the cooling channel 34, and thereby into the length region 36. Consequently, the length region 30 comes to lie in the opening 24 and the length region 32 comes to lie in the length region 36 or in the cooling channel 34. Furthermore, as a result, the cooling channels 28 and 34 are fluidically connected to one another.

Preferably, the line element 26 in the case of the first embodiment is a thin-walled small tube of a plastic, such as of a thermoplastic material, the small tube being inserted into the opening 24. Depending on the intended loading profile, the line element 26, such as the outer-circumferential lateral surface 42 thereof, may be additionally provided or coated with a plastic in the form of a thermoplastic adhesive 44. The glass transition temperature of the plastic from which the line element 26 is formed should lie above the normal operating temperature of the electrical machine.

Once the line element 26 has been arranged, such as in the way described, in the laminated stator core 12 and in the end cap 20, for example, the stator 10 is heated completely. The ohmic losses of the stator winding 18 may be used directly for this. Alternatively or in addition, it is conceivable to heat the stator 10 by means of external heating. In this case, the stator 10 is heated to a target temperature, which in a first phase still lies below the glass transition temperature of the plastic of the line element 26. In a second phase following the first phase, for example, a warm gas, such as warm air, is directed through the initially still unsealed cooling channels 28 and 34, in that the gas is for example pumped through the cooling channels 28 and 34. By means of the gas, the line element 26 is heated to a temperature which lies above the glass transition temperature of the plastic from which the line element 26 is formed. For this purpose, for example, the gas is at the temperature or a temperature that is higher than the glass transition temperature. Furthermore, for example, while it is flowing through the cooling channels 28 and 34, the gas is under a positive pressure with respect to the surrounding area 46 of the stator 10, such that for example, thanks to a naturally occurring leakage between the individual sheets 14, the line element 26 is widened by means of the gas by the pressure thereof, at least in a partial region, and is pressed against the laminated stator core 12 and against the inner-circumferential lateral surface 38. If appropriate, additional venting may be provided at specific points or locally, such as in the region of the end caps.

In the second phase, the line element 26 is adhesively bonded directly to the laminated stator core 12, such as to the inner-circumferential lateral surface 38, such as by way of the thermoplastic adhesive 44, such that for example the line element 26 remains seal-tight even without pressure. In this way, the line element 26 is sealed with respect to the laminated stator core 12 and/or with respect to the end cap 20, whereby the cooling channels 28 and 34 are sealed sufficiently.

If, for example, the line element 26 does not have a coating, and consequently for example does not have the adhesive 44, sufficient sealing as a desired end effect may depend on the process temperature, pressure and the actual material or the wall thickness of the line element 26. Respective parameters of the line element 26, formed for example as a thermoplastic insert, are a key to optimization between the thermal conductivity between the cooling medium and the laminated stator core 12, the seal-tightness in the pressureless state and the handling during production.

Figure 2:
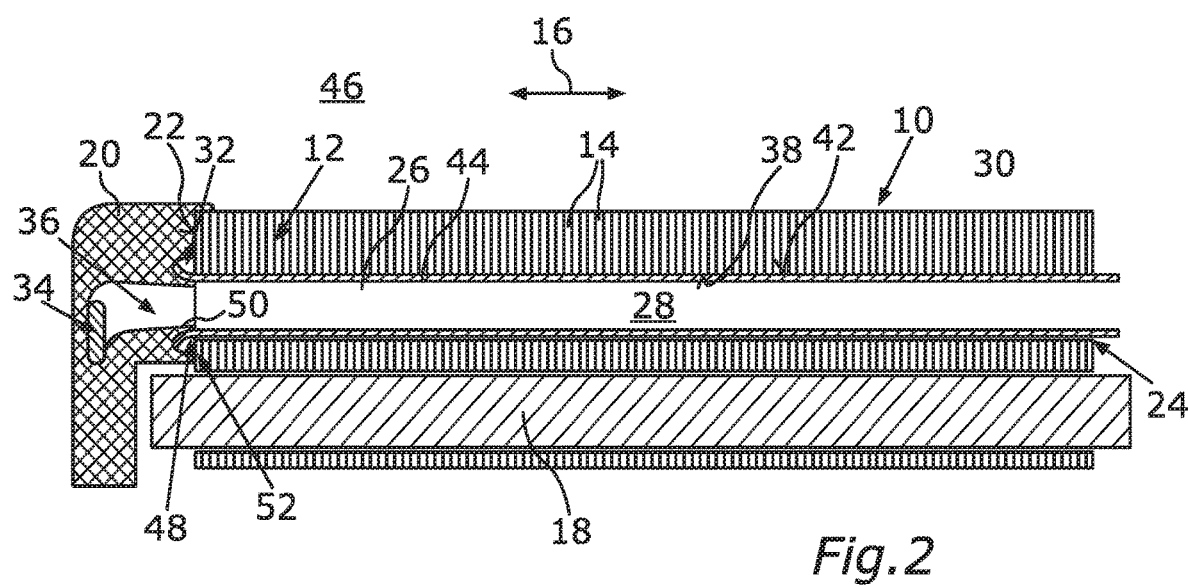
FIG. 2 shows a schematic longitudinal sectional view of a detail of the stator according to a second embodiment.

FIG. 2 shows a schematic sectional view of a detail of a second embodiment of the stator 10. The second embodiment differs from the first embodiment in that the line element 26 is formed from a deformable material, such as a metallic material, such as copper or aluminum. Furthermore, for example, the line element 26 is not necessarily provided with a coating.

In the case of the second embodiment, for example, the cooling channel 34, such as the length region 36, is narrower than in the case of the first embodiment. While in the case of the first embodiment the length region 32 extends in the cooling channel 34, and thereby in the length region 36 of the cooling channel 34, in the case of the second embodiment at least a mouth of the line element 26 or the line element 26 completely is arranged outside the cooling channel 34.

In this case, the end cap 20 has an at least substantially annular clearance 48, which is separated from the second cooling channel 34 by a wall region 50 of the end cap 20. In this case, the second length region 32 reaches into the clearance 48, such that the second length region 32 extends in the clearance 48. If, for example, in the case of the first embodiment the line element 26 is fitted through the opening 24, and is inserted into the length region 36 and consequently into the cooling channel 34, in the case of the second embodiment the line element 26 is fitted through the opening 24, and in this case is not inserted into the cooling channel 34, but into the clearance 48 separate from it.

It is conceivable that at least part of the length region 32 still extends within the cooling channel 34, and the wall region 50, which is for example also referred to as a lip, and/or the clearance 48 may only be found a little further within the end cap 20.

The wall region 50 and the clearance 48 are for example component parts of an interface 52 of the end cap 20, which is attached to the line element 26 by way of the interface 52. The length region 32 is for example inserted into the clearance 48 in such a way that the end cap 20 is moved in the axial direction of the stator 10, and is thereby moved toward the line element 26 and consequently toward the laminated stator core 12 until the end cap 20 comes to lie in a supporting manner against the end face 22. As a result, the length region 32 comes to lie in the clearance 48.

The interface 52, such as the wall region 50, is in this case formed such that for example, whenever the end cap 20 is moved toward the end face 22, or whenever the end caps are pressed one onto the other and consequently compressed in the axial direction, the line element 26 is deformed in the length region 32, and thereby widened. For example, the line element 26 is riveted or flanged in a bordering manner in the length region 32 by means of the wall region 50, such that the wall region 50 comes to lie in the cooling channel 28, and thereby in the longitudinal region 32. For example, the length region 32 lies directly against the wall region 50. In this way, a sealed termination is produced, such that the cooling channels 28 and 34 are sealed well and without additional sealing elements. A converse arrangement, i.e. one in which the line element 26 is deformed inwardly, that is to say constricted, by a wall region 50, is also conceivable.

It is in this case conceivable to additionally deform the line element 26 by a high pressure, such as hydraulic pressure in a state in which the line element 26 is already in the laminated stator core 12 and in the end cap 20, and the length region 32 has already been deformed in the way described. For this purpose, for example, a fluid is introduced into the cooling channels 28 and 34. The pressure of the fluid has the effect that the line element 26 is for example deformed, and thereby widened, and is thereby pressed against the laminated stator core 12, such as against the inner-circumferential lateral surface 38, such that the line element 26 lies right up against the inner-circumferential lateral surface 38, at least in a partial region. This allows for example a thermal resistance between the line element 26 and the laminated stator core 12 to be kept low. In other words, a thermal transfer is realized, such that heat may take place advantageously from the laminated stator core 12 to the line element 26 and from the latter to the cooling medium flowing through the cooling channels 28 and 34. The fact that, in the case of the second embodiment, the line element 26 is formed from a metallic material means that the line element 26 has a thermal conductivity. The advantage of making the line element 26 from plastic is that an electrical conductivity of the line element 26 may be avoided, whereby circulating or eddy currents may be avoided.

In the case of a third embodiment, which is not illustrated in the figures, it may be provided that the line element 26 is adhesively bonded to the end cap 20 in the clearance 48. For this purpose, for example, an adhesive is introduced into the clearance 48, such that the line element 26 is adhesively bonded to the end cap 20 by means of the adhesive. In other words, in the case of the third embodiment, a sufficient seal-tightness of the line element 26 with respect to the end cap 20 is ensured by an adhesive dispensed into the clearance 48 representing a space, which may be performed as an alternative or in addition to the deformation of the line element 26 in the length region 32 that has been described on the basis of FIG. 2. This deformation of the line element 26 in the length region 32 is for example a cold deformation, whereby the stator 10 is produced easily and inexpensively.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS

10 Stator
12 Laminated stator core
14 Individual sheet
16 Double-headed arrow
18 Stator winding
20 End plate
22 End face
24 Opening
26 Line element
28 First cooling channel
30 First length region
32 Second length region
34 Second cooling channel
36 Third length region
38 Inner-circumferential lateral surface
40 Inner-circumferential lateral surface
42 Outer-circumferential lateral surface
44 Adhesive
46 Surrounding area
48 Clearance
50 Wall region
52 Interface

What is claimed is:

1. A stator for an electrical machine, comprising:
   at least one laminated stator core;
   at least one end cap following the at least one laminated stator core in an axial direction of the stator;
   at least one line element, which is formed separately from the at least one end cap and separately from the at least one laminated stator core, the at least one line element further comprising:
   at least one first cooling channel, through which a cooling medium for cooling the stator may flow;
   a first length region, extending in the at least one laminated stator core;
   a second length region, which extends in the at least one end cap;
   at least one second cooling channel being part of the at least one end cap, through which the cooling medium may flow and which is fluidically connected to the at least one first cooling channel;
   a clearance being part of the at least one end cap; and
   a wall region;
   wherein the clearance is separated from the at least one second cooling channel by the wall region, and the second length region extending in the clearance.

2. The stator of claim 1, the at least one line element further comprising an intrinsically rigid pipe element.

3. The stator of claim 1, wherein the at least one line element is formed from at least one plastic.

4. The stator of claim 1, wherein the at least one line element is formed from a metallic material.

5. The stator of claim 1, wherein the at least one line element is coated with a plastic.

6. The stator of claim 5, the plastic further comprising a thermoplastic.

7. The stator of claim 1, wherein the at least one line element is deformed, and thereby widened, at least in a partial region.

8. The stator of claim 1, wherein the second length region extends in the at least one second cooling channel.

9. The stator of claim 1, wherein the at least one line element is connected in a material-bonding manner to the at least one end cap in the clearance.

10. The stator of claim 9, wherein the at least one line element is connected in an adhesively bonded manner to the at least one end cap in the clearance.

11. The stator of claim 1, wherein at least part of the second length region is deformed by means of the wall region.

12. A method for producing a stator for an electrical machine, comprising the steps of:
providing at least one laminated stator core;
providing at least one end cap;
providing at least one line element, which is formed separately from the at least one end cap and separately from the at least one laminated stator core;
providing at least one first cooling channel being part of the at least one line element, through which a cooling medium for cooling the stator may flow;
providing at least one second cooling channel being part of the at least one end cap, the at least one second cooling channel through which the cooling medium may flow;
providing a wall region; and
providing a clearance being part of the at least one end cap, and the clearance is separated from the at least one second cooling channel by the wall region;
arranging the at least one end cap in such a way that the at least one end cap follows the at least one laminated stator core in an axial direction of the stator;
arranging a first length region of the at least one line element in the at least one laminated stator core;
arranging a second length region of the at least one line element in the at least one end cap, such that the second length region extends in the clearance;
fluidically connecting the at least one first cooling channel to the at least one second cooling channel.

13. The method of claim 12, further comprising the steps of:
providing an opening formed in the at least one laminated stator core;
arranging the at least one end cap relative to the at least one laminated stator core in such a way that at least part of the at least one second cooling channel overlaps the opening formed in the at least one laminated stator core;
arranging the first length region in the at least one laminated stator core and arranging the second length region in the at least one end cap such that the cooling channels are fluidically connected to one another such that that the at least one line element is fitted through the opening in the axial direction of the stator and inserted into the at least one end cap.

14. The method of claim 12, further comprising the steps of:
heating the at least one line element to a state in which the first length region is arranged in the at least one laminated stator core and the second length region is arranged in the at least one end cap such that at least a partial region of the at least one line element is deformed, and thereby widened.

15. The method of claim 14, further comprising the steps of:
widening the at least one line element, at least in the partial region, using a fluid which is directed into the cooling channels.

16. The method of claim 15, further comprising the steps of providing the fluid to be a liquid.

17. The method of claim 15, further comprising the steps of providing the fluid to be a gas.

18. The method of claim 15, further comprising the steps of heating the at least one line element using the fluid.

* * * * *